(12) United States Patent
Kino et al.

(10) Patent No.: US 10,486,633 B2
(45) Date of Patent: Nov. 26, 2019

(54) VEHICLE AIRBAG DEVICE AND WRAPPING MATERIAL USED IN VEHICLE AIRBAG DEVICE

(71) Applicant: TOYODA GOSEI CO., LTD., Kiyosu-shi, Aichi-ken (JP)

(72) Inventors: Masao Kino, Kiyosu (JP); Norihisa Taya, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 8 days.

(21) Appl. No.: 15/682,607

(22) Filed: Aug. 22, 2017

(65) Prior Publication Data

US 2018/0086296 A1    Mar. 29, 2018

(30) Foreign Application Priority Data

Sep. 28, 2016 (JP) .................................. 2016-189977

(51) Int. Cl.
| | |
|---|---|
| B60R 21/201 | (2011.01) |
| B60R 21/207 | (2006.01) |
| B60R 21/2165 | (2011.01) |
| B60R 21/217 | (2011.01) |
| B60R 21/231 | (2011.01) |
| B60R 21/237 | (2006.01) |
| B60R 21/268 | (2011.01) |

(52) U.S. Cl.
CPC .......... *B60R 21/201* (2013.01); *B60R 21/207* (2013.01); *B60R 21/2165* (2013.01); *B60R 21/2171* (2013.01); *B60R 21/237* (2013.01); *B60R 21/23138* (2013.01); *B60R 21/268* (2013.01)

(58) Field of Classification Search
CPC ..... B60R 21/20; B60R 21/201; B60R 21/207; B60R 21/23138; B60R 21/237; B60R 2021/23146; B60R 21/2171
See application file for complete search history.

(56) References Cited

U.S. PATENT DOCUMENTS

| | | | | |
|---|---|---|---|---|
| 5,765,867 | A | * | 6/1998 | French .................... B60R 21/16 280/743.1 |
| 5,779,263 | A | * | 7/1998 | Lane, Jr. ............... B60R 21/201 280/728.2 |

(Continued)

FOREIGN PATENT DOCUMENTS

| | | |
|---|---|---|
| JP | 2003-104155 A | 4/2003 |
| JP | 2004-291887 A | 10/2004 |

*Primary Examiner* — Frank B Vanaman
(74) *Attorney, Agent, or Firm* — Posz Law Group, PLC

(57) ABSTRACT

A vehicle airbag device includes: an airbag; a gas generator which supplies an inflation gas to the airbag; and a wrapping material, which covers a periphery of an airbag assembly including the airbag and the gas generator. The wrapping material includes: a combining part which is formed of a sheet material and combines both edges, which are overlapped with each other in a length direction; an engagement part which is formed in parallel with the combining part in a width direction of the sheet material and is engaged in the gas generator; and a notch portion formed between the combining part of both edges and the engagement part, wherein a position of a deepest part of the notch portion in the length direction of the sheet material is less than or equal to a depth of the combining part.

7 Claims, 8 Drawing Sheets

(56) References Cited

U.S. PATENT DOCUMENTS

| | | | | |
|---|---|---|---|---|
| 6,045,151 A | * | 4/2000 | Wu | B60R 21/207 |
| | | | | 280/728.3 |
| 6,099,026 A | * | 8/2000 | Ando | B60R 21/201 |
| | | | | 280/728.1 |
| 2002/0005634 A1 | * | 1/2002 | Alb | B60R 21/20 |
| | | | | 280/730.2 |
| 2006/0012157 A1 | * | 1/2006 | Ishiguro | B60R 21/201 |
| | | | | 280/731 |
| 2009/0079169 A1 | * | 3/2009 | Yokota | B60R 21/20 |
| | | | | 280/728.3 |
| 2013/0015640 A1 | * | 1/2013 | Lusk | B60R 21/207 |
| | | | | 280/728.2 |
| 2017/0028958 A1 | * | 2/2017 | Goto | B60R 21/233 |
| 2017/0028962 A1 | * | 2/2017 | Goto | B60R 21/23138 |

* cited by examiner

VEHICLE AIRBAG DEVICE AND WRAPPING MATERIAL USED IN VEHICLE AIRBAG DEVICE

CROSS-REFERENCE TO RELATED APPLICATION(S)

This application is based upon and claims the benefit of priority from Japanese Patent Application No. 2016-189977, filed on Sep. 28, 2016, the entire contents of which are incorporated herein by reference.

BACKGROUND

1. Field of the Invention

The present invention relates to a vehicle airbag device and a wrapping material which is used in the device and which covers a periphery of an airbag assembly and is rupturable at the time of deployment and expansion of the airbag.

2. Description of the Related Art

In the related art, for example, a side airbag device of an automobile includes an airbag assembly which has a folded airbag and a long gas generator which is mounted in a vehicle and supplies an inflation gas into the airbag. In addition, the periphery of the airbag assembly is covered by a wrapping material which is rupturable at the time of deployment and expansion of the airbag. The wrapping material prevents a folding looseness of the airbag, or controls the deployment and expansion of the airbag (for example, see JP-A-2003-104155).

The wrapping material described in JP-A-2003-104155 is formed of a sheet material, and both edges in a width direction are thermally welded in a state where the sheet material is folded back at a fold line along a width direction of the sheet material. Accordingly, an upper end and a lower end of the wrapping material are combined with each other to be a bag shape. In addition, a pair of insertion holes through which a pair of mounting bolts protruding from a side surface of the gas generator are inserted are formed in both edges of the sheet material in a length direction, respectively. In a state where the airbag assembly is stored in the wrapping material, the pair of insertion holes formed in one edge of the sheet material are externally fitted in the pair of mounting bolts. Subsequently, the pair of insertion holes formed in the other edge of the sheet material are externally fitted from the upper side of the one edge in the pair of mounting bolts, whereby the wrapping material is engaged in the mounting bolts.

Incidentally, in the airbag device including the wrapping material described in JP-A-2003-104155, in a case where a volume of the airbag in a folded state is large with respect to a longitudinal direction of the gas generator, there is a concern that following inconvenience occurs. That is, in a portion, which is overlapped with the gas generator in the longitudinal direction, of the folded airbag, both edges of the sheet material in the length direction are engaged in the mounting bolts. This suppresses airbag deployment and expansion in a protruding direction of the mounting bolt. However, in a portion, which protrudes from the gas generator in the longitudinal direction, of the folded airbag, it is difficult to suppress deployment and expansion of the airbag.

SUMMARY

An object of the present invention is to provide a vehicle airbag device and a wrapping material used in the vehicle airbag device which can control deployment and expansion of an airbag with a simple configuration.

In order to achieve the above object, according to an aspect of the present invention, there is provided a vehicle airbag device includes: a folded airbag; a long gas generator which is mounted in a vehicle and supplies an inflation gas to the airbag; and a wrapping material which covers a periphery of an airbag assembly including the airbag and the gas generator and is rupturable at a time of deployment and expansion of the airbag. The wrapping material includes a combining part which is formed of a sheet material and combines both edges, which are overlapped with each other, of the sheet material in a length direction, a cylindrical part which is formed by the combining part and the sheet material, and an engagement part which is formed in parallel with the combining part in a width direction of the sheet material and is engaged in the gas generator. A notch portion is formed between the combining part and the engagement part in each of the edges, and a position of a deepest part of the notch portion in the length direction of the sheet material is the same as that of the combining part, or is set outside from the combining part.

With the configuration, the notch portion is formed in the wrapping material, and thus the engagement part is easily relatively displaced with respect to the combining part. For this reason, in a state where one end portion of the airbag assembly is inserted into the cylindrical part of the wrapping material, an operation of engaging the engagement part in the gas generator can be performed easily.

Herein, with the above-described configuration, since the position of the deepest part of the notch portion in the length direction of the sheet material is the same as that of the combining part or is set outside from the combining part, a stress can be reduced which acts on the notch portion at the time of a mounting operation of the wrapping material or at the time of the deployment and expansion of the airbag. Therefore, it can be suppressed that the wrapping material is ruptured with the notch portion set as a base point.

With the above-described configuration, the combining part is formed in parallel with the engagement part in the width direction of the sheet material. Thus, in a portion, which protrudes from the gas generator in the width direction (that is, the longitudinal direction of the gas generator), of the folded airbag, the deployment and expansion of the airbag is controlled by the combining part.

Therefore, the deployment and expansion of the airbag can be controlled with the simple configuration.

In the vehicle airbag device of the present invention, the gas generator may have an inflator which is capable of supplying the inflation gas and a retainer which holds the inflator, a mounting bolt which mounts the retainer in the vehicle may be provided on a side surface of the retainer to protrude, a pair of the engagement parts may be formed in both of the edges of the sheet material in the length direction, respectively, and an insertion hole through which the mounting bolt is inserted may be formed in each of the engagement parts.

With the configuration, in a state where the airbag assembly is inserted into the cylindrical part of the wrapping material, the insertion hole of one engagement part is externally fitted in the mounting bolt, and then the insertion hole of the other engagement part is externally fitted in the mounting bolt, whereby the pair of engagement parts are engaged in the mounting bolts of the gas generator.

At that time, each of the engagement parts is easily relatively displaced with respect to the combining part by the notch portion formed between each of the engagement parts and the combining part.

In the vehicle airbag device of the present invention, a plurality of the mounting bolts may be provided at an interval in a longitudinal direction of the gas generator to be directed to a same direction, a plurality of the insertion holes through which the plurality of the mounting bolts are inserted respectively may be formed in each of the engagement parts, and the combining part may extend along a virtual linear line connecting centers of the plurality of the insertion holes.

With the configuration, it can be suppressed properly that the posture of the airbag assembly is slanted in the wrapping material. In addition, the pressure of the deploying and expanding airbag can act uniformly on the entire combining part which extends over a predetermined length. For this reason, the deployment and expansion of the airbag can be controlled easily and properly.

In the vehicle airbag device of the present invention, the combining part may be formed by sewing both edges.

With the configuration, the combining part can be formed easily.

In the vehicle airbag device of the present invention, both ends of the wrapping material in the width direction of the sheet material may be open.

With the configuration, the configuration of the wrapping material can be simplified. In addition, the airbag assembly can be inserted through the open end of the wrapping material into the wrapping material, and the wrapping material can be easily mounted in the airbag assembly.

According to another aspect of the invention, there is provided a wrapping material used in the vehicle airbag device according the above.

According to the present invention, the deployment and expansion of the airbag can be controlled with the simple configuration.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, one embodiment of a vehicle airbag device and a wrapping material used in the airbag device will be described with reference to FIGS. 1 to 8. Incidentally, hereinafter, an advance direction and a retreat direction of the vehicle are described as a front side and a rear side, respectively. In addition, with a central portion in a vehicle width direction set as a reference, a side close to the central portion in the vehicle width direction is described as a vehicle inside, and a side far from the central portion is described as a vehicle outside.

Figure 1:
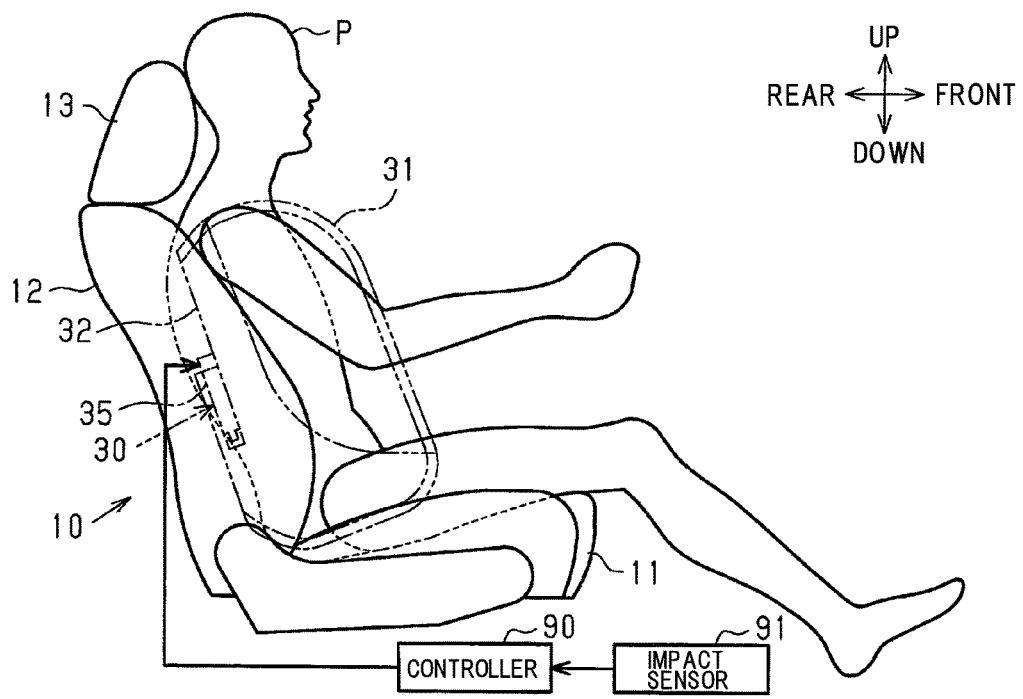
FIG. 1 is a side view illustrating a vehicle seat provided with a vehicle airbag device according to one embodiment, where an occupant is seated, when veiwed from a vehicle outside.

As illustrated in FIG. 1, a vehicle seat 10 includes a seat cushion 11, a seat back 12 which stands from a rear end of the seat cushion 11 and is configured such that a slant angle is adjustable, and a headrest 13 mounted in an upper end of the seat back 12. The vehicle seat 10 is arranged in a vehicle cabin in a posture where the seat back 12 is directed to the front side. The width direction of the vehicle seat 10 arranged as described above matches with the vehicle width direction.

Figure 2:
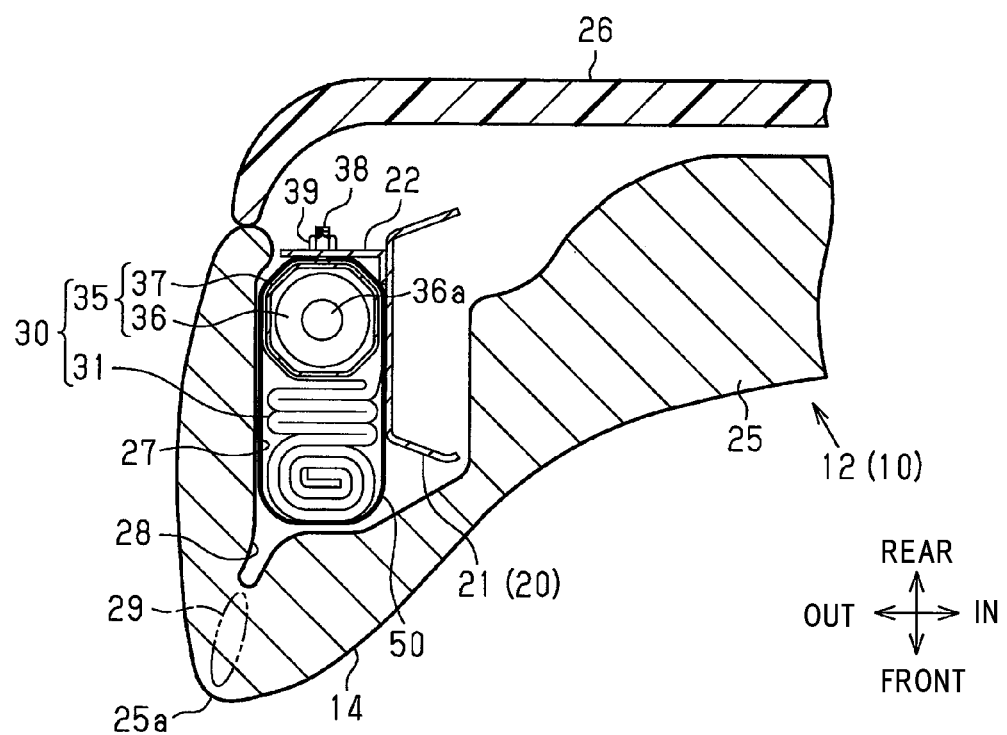
FIG. 2 is a partial sectional view illustrating an inner structure of a seat back in which an airbag assembly in the embodiment is embedded.

As illustrated in FIG. 2, a pair of side supports 14 which protrude forward from another portion of the seat back 12 are formed in both sides of the seat back 12 in the vehicle width direction. Incidentally, the side support 14 on the vehicle outside is illustrated in the drawing.

A seat frame 20 is arranged inside the seat back 12. The seat frame 20 is formed of a metal plate, and has a pair of side frames 21 extending vertically. Incidentally, the side frame 21 on the vehicle outside is illustrated in the drawing. A bracket 22 which extends in the vehicle width direction and the vertical direction is fixed on the vehicle outside of the side frame 21.

A seat pad 25 formed of an elastic material such as urethane foam is arranged on the front side of the seat frame 20 including the side frame 21 and the bracket 22. In addition, a hard back board 26 formed of synthetic resin and the like is arranged on the rear side of the seat frame 20. Incidentally, the seat pad 25 is coated with a skin, but the skin is not illustrated in the drawing.

A storage part 27 is formed on the vehicle outside from the side frame 21 in the rear surface of the seat pad 25. An airbag assembly 30 is embedded in the storage part 27. As illustrated in FIG. 1, in a side airbag device, in a case where an impact is applied due to a side impact to the side wall of the vehicle such as the door close to the vehicle seat 10, a gas generator 35 supplies an inflation gas to an airbag 31, so that the airbag 31 deploys and expands between the side wall and the vehicle seat 10. Thus, an occupant P sitting on the vehicle seat 10 is protected from the impact.

As illustrated in FIG. 2, a slit 28 which slantingly extends to be positioned toward the vehicle outside according to the front side is formed in the vehicle-outside corner of the storage part 27. As illustrated by a two-dot chain line in the drawing, a portion between a vehicle-outside corner 25a in the front portion of the seat pad 25 and the slit 28 configures a rupture expected portion 29 which is ruptured by the airbag 31.

Next, the description will be given about the airbag assembly 30. As illustrated in FIGS. 1 to 6, the above-described airbag assembly 30 includes the airbag 31 and the gas generator 35.

<Airbag 31>

As illustrated by two-dot chain line in FIG. 1, the airbag 31 is formed such that one piece of cloth is folded twice along a fold line 32 set in the central portion thereof to be overlapped in the vehicle width direction, and the overlapped portion is combined to have a bag shape. Incidentally, FIG. 1 illustrates a state where the airbag 31 is not filled with the inflation gas and is deployed in a plan shape.

<Gas Generator 35>

As illustrated in FIGS. 2 to 6, the gas generator 35 includes an inflator 36 which can supply the inflation gas, and a retainer 37 which holds the inflator 36.

In this embodiment, the inflator 36 is adopted as a pyro type that generates the inflation gas by combustion of gunpowder. The inflator 36 has a casing having a substantially columnar shape and a gas generating agent (not illustrated) which is contained in the casing and generates the inflation gas. A gas injection part 36a is provided in the lower end of the inflator 36. In addition, a harness (not illustrated) which serves as an input wiring of an operation signal sent to the inflator 36 is connected with the upper end of the inflator 36.

Incidentally, instead of the above-described pyro type, the inflator 36 may be changed to a hybrid type which injects the inflation gas when a partition of a high pressure gas cylinder filled with a high pressure gas is ruptured by the gunpowder and the like.

The retainer 37 functions as an engaging member which engages the inflator 36 in the bracket 22 together with the airbag 31, and is formed of a metal plate to have a substantially cylindrical shape. As illustrated in FIGS. 3 to 6, two mounting bolts 38 for mounting the retainer 37 in the side frame 21 are provided in the side surface of the retainer 37 to protrude rearward at an interval in the longitudinal direction of the retainer 37.

As illustrated in FIG. 2, the mounting bolt 38 is fastened with a nut 39 from the rear side in a state where the mounting bolts 38 are inserted in bolt holes (not illustrated) of the bracket 22, respectively, so that the rear end of the airbag 31 is mounted in the bracket 22 together with the gas generator 35. In this manner, the gas generator 35 is mounted in the side frame 21 with the bracket 22 interposed therebetween.

Incidentally, in this embodiment, the gas generator 35 in which the inflator 36 and the retainer 37 are formed as separate bodies is described as an example. However, the gas generator 35 may be configured such that the inflator 36 and the retainer 37 are formed integrally.

Figure 4:
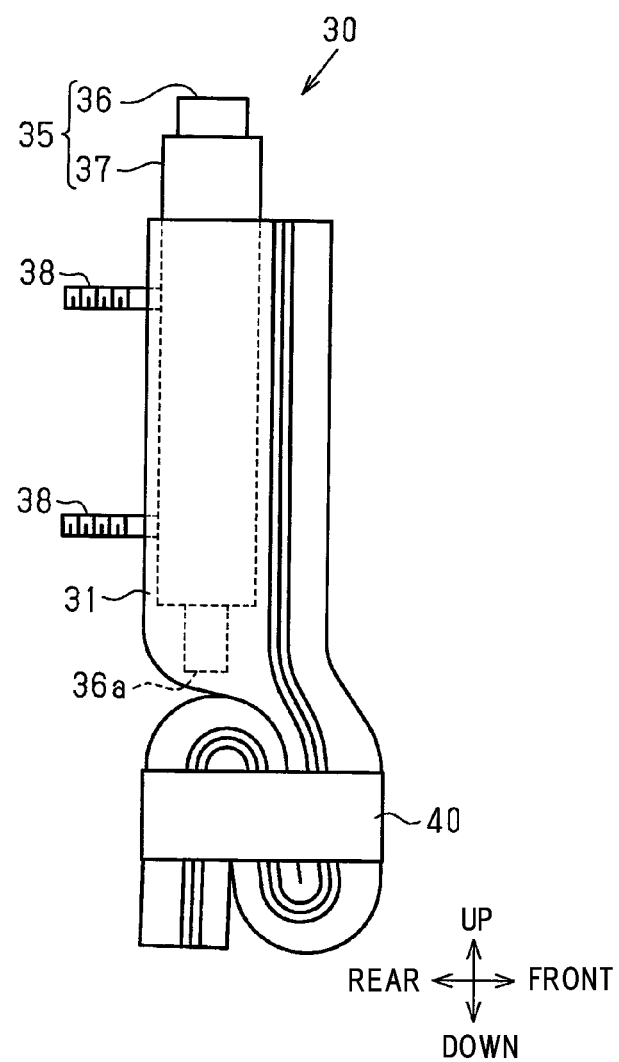
FIG. 4 is a side view illustrating the airbag assembly of the embodiment when veiwed from the vehicle outside.

As illustrated in FIG. 4, in the airbag assembly 30, the folded airbag 31 is positioned below the upper end of the gas generator 35. In addition, a portion, which is positioned below the lower end of the gas generator 35, of the airbag 31 is folded back and forth, and is restrained by a belt 40 so as not to loose folding.

Figure 3:
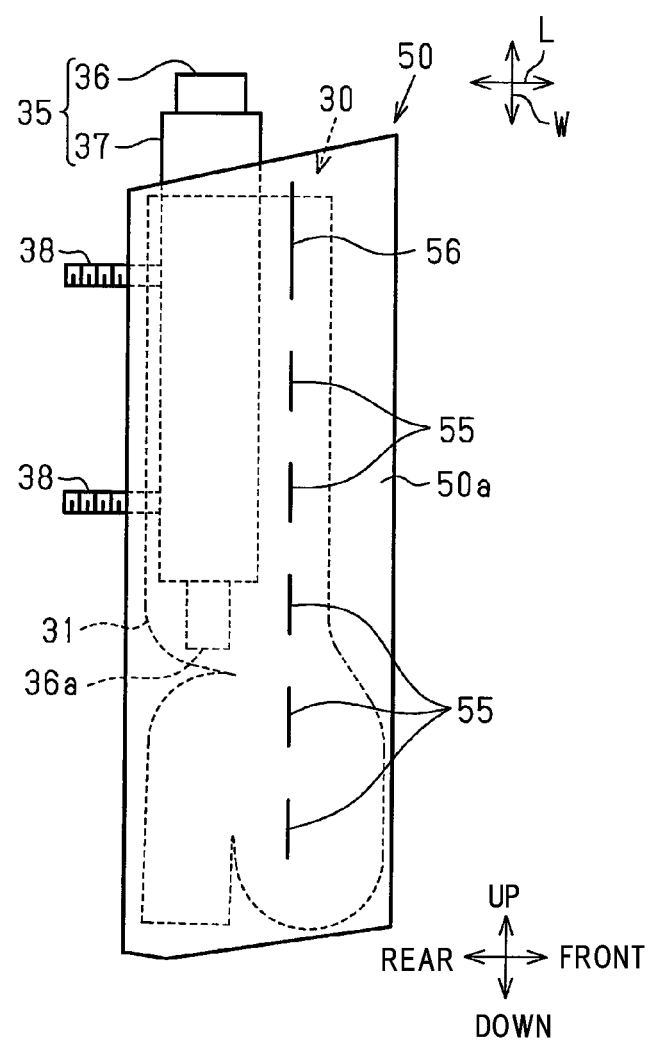
FIG. 3 is a side view illustrating the airbag assembly covered with a wrapping material of the embodiment when veiwed from the vehicle outside.
Figure 5:
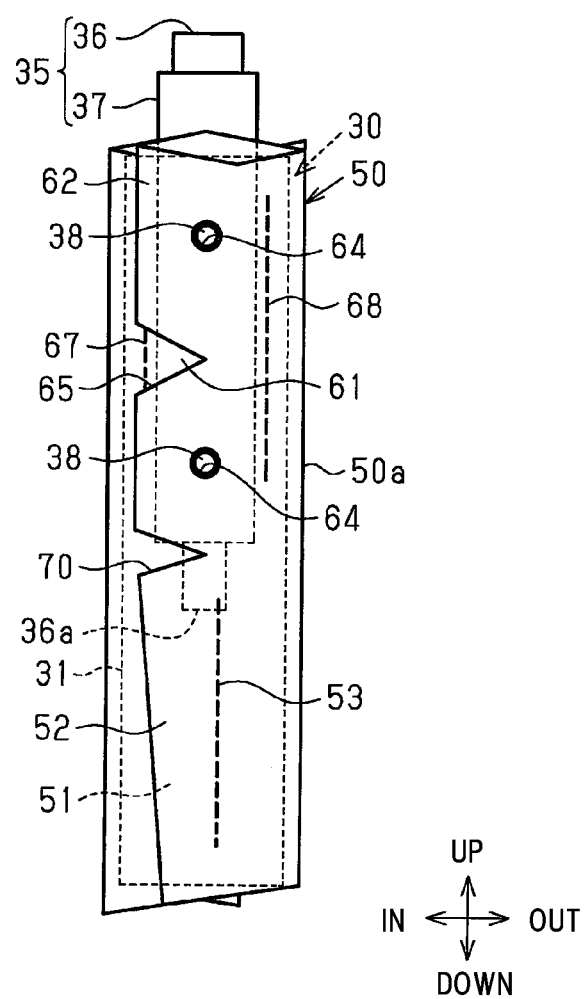
FIG. 5 is a back view illustrating the airbag assembly covered with the wrapping material of the embodiment when veiwed from a rear side.
Figure 6:
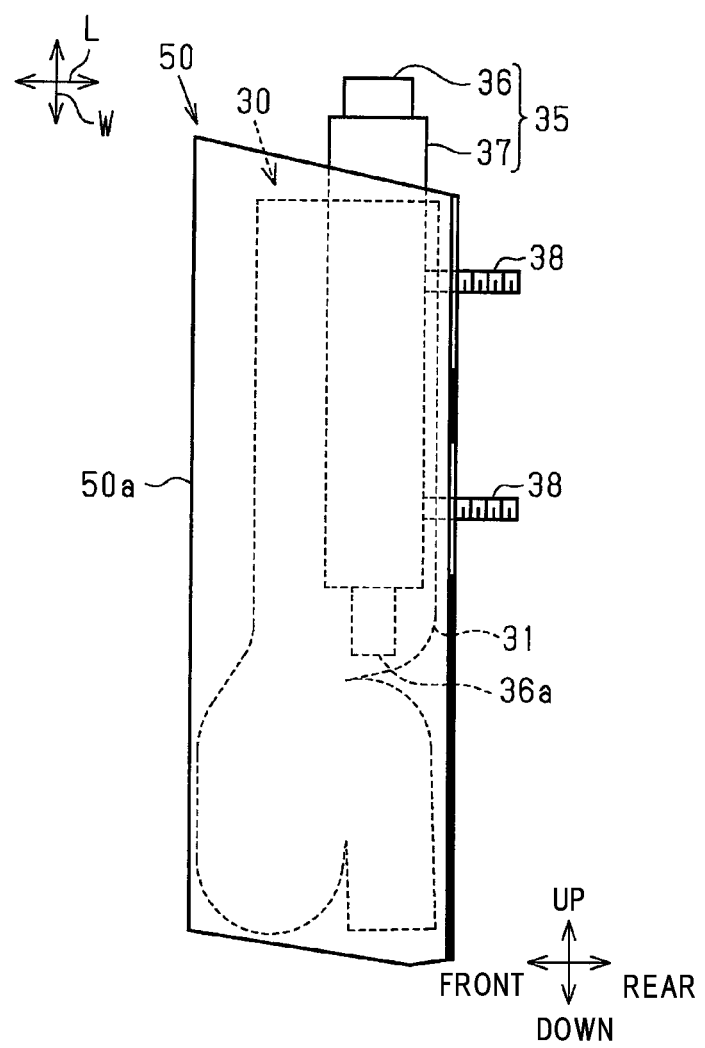
FIG. 6 is a side view illustrating the airbag assembly covered with the wrapping material of the embodiment when veiwed from a vehicle inside.

As illustrated in FIGS. 3, 5, and 6, the periphery of the airbag assembly 30 is covered with a wrapping material 50 which is rupturable at the time of the deployment and expansion of the airbag 31. Next, the description will be given about the wrapping material 50.

<Wrapping Material 50>

As illustrated in FIGS. 3, 5, and 7, the wrapping material 50 is formed of a flame-retardant sheet material 50a.

Figure 7A:
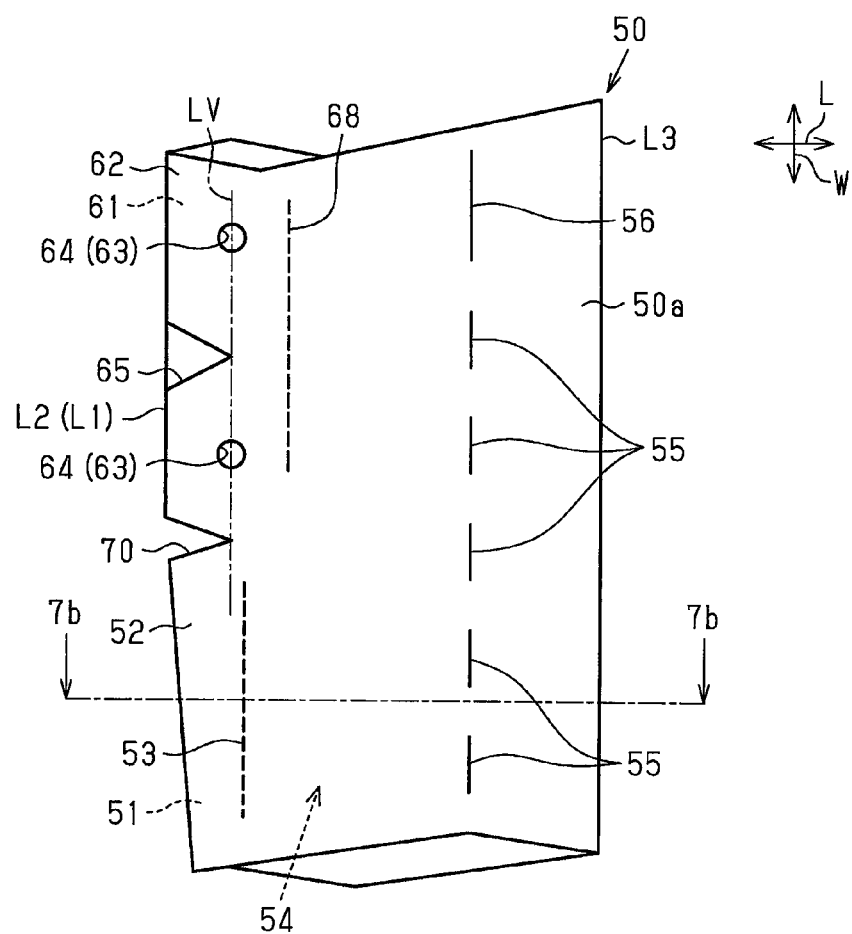
FIG. 7A is a plan view illustrating the wrapping material of the embodiment.
Figure 7B:
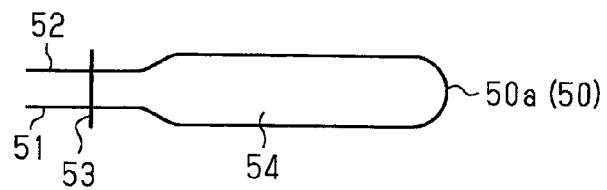
FIG. 7B is a sectional view of the wrapping material of the embodiment when viewed along line 7b-7b.

As illustrated in FIGS. 7A and 7B, the wrapping material 50 is folded in half along a fold line L3 which passes through the central portion of the sheet material 50a in a length direction (which is a right and left direction of the drawing, and hereinafter is referred to as a length direction L) and extends in a width direction (which is a vertical direction in the drawing, and hereinafter is referred to as a width direction W) of the sheet material 50a.

As illustrated in FIGS. 3, and 7A and 7B, the wrapping material 50 has a combining part 53 which combines a first edge 51 and a second edge 52, which are overlapped with each other, of the sheet material 50a in the length direction L. In this embodiment, the combining part 53 is formed by sewing both of the edges 51 and 52 in the width direction W.

As illustrated in FIGS. 7A and 7B, a cylindrical part 54 is formed in the lower portion of the wrapping material 50 by the sheet material 50a and the combining part 53. As illustrated in FIGS. 5 and 7A, in the wrapping material 50, a first engagement part 61 and a second engagement part 62 which are engaged in two mounting bolts 38 of the gas generator 35 are formed in parallel with the combining part 53 in the width direction W, that is, in the longitudinal direction of the gas generator 35.

As illustrated in FIG. 7A, both engagement parts 61 and 62 are formed in both edges of the sheet material 50a in the length direction L, respectively. However, in this embodiment, the sheet material 50a is double-folded back along each of the fold lines L1 and L2 extending in the width direction W, and the folded-back portions are combined by the combining parts 67 and 68, respectively (see FIGS. 8A and 8B). Further, the above-described both engagement parts 61 and 62 are formed in both of the edges of the folded-back sheet material 50a, respectively. Accordingly, both engagement parts 61 and 62 are reinforced.

In the first engagement part 61, two insertion holes 63 through which two mounting bolts 38 are inserted respectively are formed at an interval in the width direction W. The centers of two insertion holes 63 are positioned on a virtual linear line LV which extends in the width direction W.

In the second engagement part 62, two insertion holes 64 through which two mounting bolts 38 are inserted respectively are formed at an interval in the width direction W. The centers of two insertion holes 64 are positioned on the virtual linear line LV which extends in the width direction W.

Herein, a notch portion 65 which is notched in a horizontal V shape from the fold line L2 side is formed in a portion between two insertion holes 64 in the second engagement part 62. On the other hand, a notch portion corresponding to the notch portion 65 is not formed in the first engagement part 61.

The notch portion 70 notched in a horizontal V shape is formed between the combining part 53 in both of the edges 51 and 52 of the sheet material 50a and the engagement parts 61 and 62. The deepest part of the notch portion 70 in the length direction L is positioned outside (left side in FIGS. 7A and 7B) from the combining part 53, and is positioned on the virtual linear line LV.

The upper end and the lower end of the wrapping material 50 in the width direction W, that is, in the longitudinal direction of the gas generator 35 are open. As illustrated in FIGS. 3 and 7A, in a portion, which is positioned on the vehicle outside of the airbag assembly 30, of the wrapping material 50, a first slit 55 and a second slit 56 are formed at an interval in a row along the width direction W. In this embodiment, a plurality of the first slits 55 are formed at the same interval in the width direction W. In addition, the second slit 56 which is longer than the first slit 55 is formed on the upper side of the first slit 55 which is positioned at the uppermost part.

As illustrated in FIG. 1, in addition to the above-described airbag assembly 30, the side airbag device includes an impact sensor 91 configured by an acceleration sensor and the like, and a controller 90. The impact sensor 91 is provided in the side wall of the vehicle, and detects the impact which is applied to the same side wall from side. The controller 90 controls an operation of the inflator 36 on the basis of a detection signal sent from the impact sensor 91.

A seat belt device which restrains the occupant P sitting on the vehicle seat 10 to the vehicle seat 10 is mounted in the vehicle (not illustrated). Next, a manufacturing procedure of the wrapping material 50 will be described with reference to FIGS. 8A to 8C.

Figure 8A:
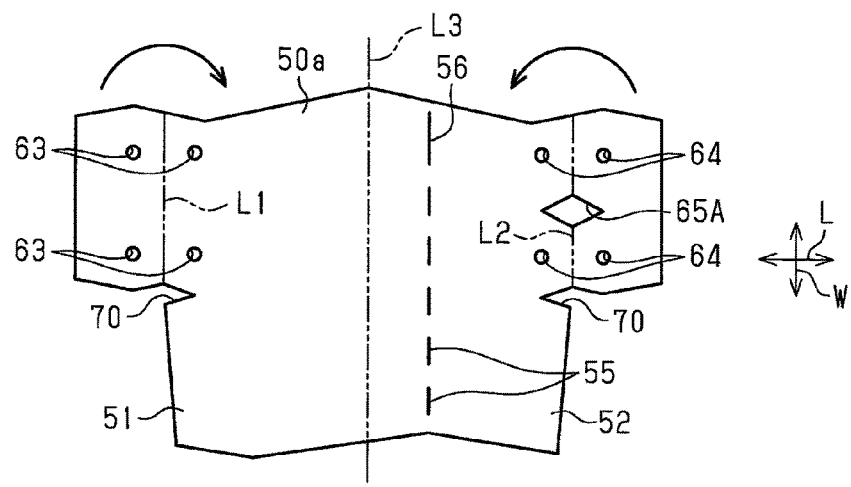
FIG. 8A is a plan view.

As illustrated in FIG. 8A, first, both of the edges of the sheet material 50a in the length direction L are folded back along the fold lines L1 and L2 respectively, so that the pair of insertion holes 63 and 64 which are formed on both sides with the fold lines L1 and L2 interposed therebetween match with each other. At that time, the inner circumferential edge of a rhombic-shaped through hole L65A formed on one fold line L2 is folded back in half, so that the notch portion 65 is formed.

Figure 8B:
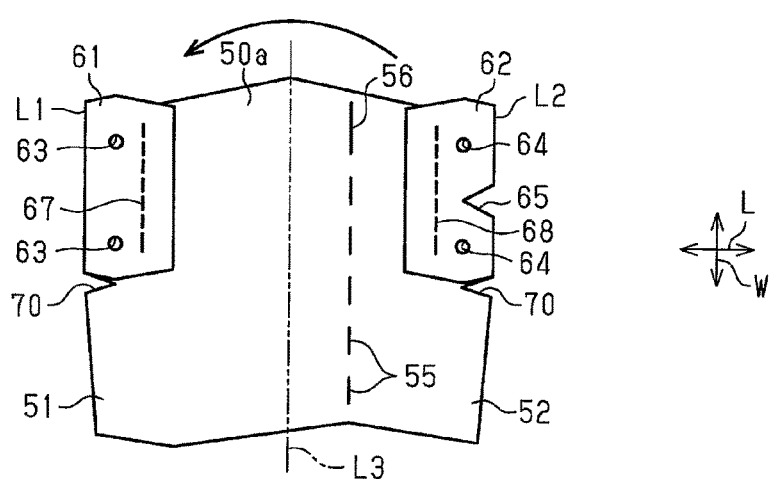
FIG. 8B is another plan view.

Subsequently, as illustrated in FIG. 8B, an overlapped portion, which is inside from the insertion holes 63 and 64 in the length direction L, of the sheet material 50a is sewn along the width direction W, so that the combining parts 67 and 68 are formed.

Figure 8C:
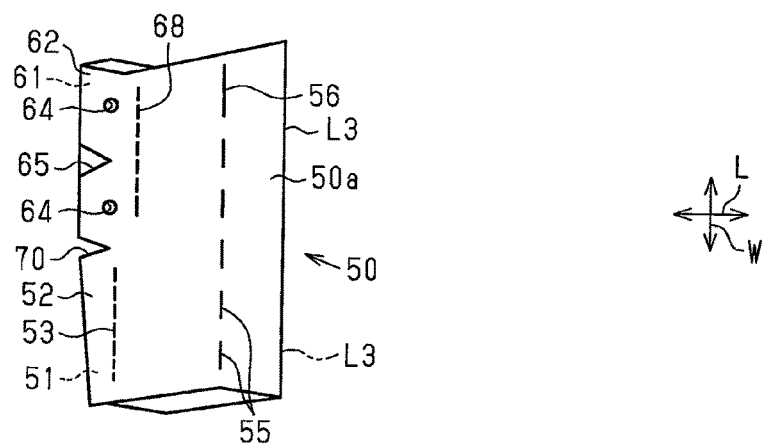
FIG. 8C is yet another plan view, illustrating a manufacturing procedure of the wrapping material of the embodiment.

In this manner, both engagement parts 61 and 62 are formed in both of the edges of the sheet material 50a. Subsequently, as illustrated in FIG. 8C, the sheet material 50a is folded back along the fold line L3 which passes through the central portion in the length direction L and extends in the width direction W, so that both of the edges 51 and 52 of the sheet material 50a in the length direction L are overlapped with each other.

The portions, which are inside from the deepest part of the notch portion 70 in the length direction L, of both of the edges 51 and 52 are sewn along the width direction W, so that the combining part 53 is formed. When the wrapping material 50 including such a configuration is mounted in the airbag assembly 30, first, the lower end portion of the airbag assembly 30 illustrated in FIG. 3 is inserted from the upper side of the drawing into the cylindrical part 54 of the wrapping material 50 illustrated in FIG. 7A.

Subsequently, the pair of insertion holes 63 of the first engagement part 61 of the wrapping material 50 are externally fitted in the pair of mounting bolts 38 of the airbag assembly 30, respectively. Subsequently, the pair of insertion holes 64 of the second engagement part 62 of the wrapping material 50 are externally fitted in the pair of mounting bolts 38, respectively.

In this manner, a pair of the engagement parts 61 and 62 are engaged in the mounting bolts 38, so that the wrapping material 50 is mounted in the airbag assembly 30 (see FIGS. 3 to 6). Next, the description will be given about the effect of this embodiment.

Since the notch portion 70 is formed between each of the engagement parts 61 and 62 and the combining part 53 in the wrapping material 50, the engagement parts 61 and 62 are easily relatively displaced with respect to the combining part 53. For this reason, in a state where the lower end portion of the airbag assembly 30 is inserted into the cylindrical part 54 of the wrapping material 50, an operation of externally fitting the insertion holes 63 and 64 of the engagement parts 61 and 62 in the mounting bolt 38, that is, an operation of engaging the engagement parts 61 and 62 in the gas generator 35 can be performed easily.

Herein, since the position of the deepest part of the notch portion 70 in the length direction L is set outside from the combining part 53, a stress can be reduced which acts on the notch portion 70 at the time of a mounting operation of the wrapping material 50 or at the time of the deployment and expansion of the airbag 31. Therefore, it can be suppressed that the wrapping material 50 is ruptured with the notch portion 70 set as a base point.

With the above-described configuration, the combining part 53 is formed in parallel with the engagement parts 61 and 62 in the width direction W. Thus, in a portion, which protrudes downward from the gas generator 35 in the width direction W, of the folded airbag 31, the deployment and expansion of the airbag 31 is controlled by the combining part 53.

The notch portion 65 is formed between the pair of insertion holes 64 in the second engagement part 62, and thus a portion including one insertion hole 64 and a portion including the other insertion hole 64 in the second engagement part 62 are relatively displaced easily. Therefore, under the circumstance that the first engagement part 61 is engaged in the gas generator 35 in advance, and the second engagement part 62 is hardly displaced, the second engagement part 62 can be easily engaged in the gas generator 35.

With the vehicle airbag device according to this embodiment and the wrapping material used in the vehicle airbag device which are described above, following effects can be obtained.

(1) The wrapping material 50 has the combining part 53 which combines both of the edges 51 and 52, which are overlapped with each other, of the sheet material 50a in the length direction L, and the pair of engagement parts 61 and 62 which are formed in parallel with the combining part 53 in the width direction W of the sheet material 50a and are engaged in the gas generator 35. The pair of engagement parts 61 and 62 are formed in both of the edges 51 and 52 of the sheet material 50a, respectively, and the insertion holes 63 and 64 through which the mounting bolts 38 are inserted are formed in the engagement parts 61 and 62, respectively. The notch portions 70 are formed between the combining part 53 and the pair of engagement parts 61 and 62 in both of the edges 51 and 52. A position of the deepest part of the notch portion 70 in the length direction L is set outside from the combining part 53.

With such a configuration, the above-described effect is obtained so that the deployment and expansion of the airbag 31 can be controlled with the simple configuration.

(2) The plurality of insertion holes 63 and 64 through which the plurality of mounting bolts 38 are inserted respectively are formed in the engagement parts 61 and 62. The combining part 53 extends along the virtual linear line LV which connects the centers of the plurality of insertion holes 63 and 64.

With such a configuration, it can be suppressed properly that the posture of the airbag assembly 30 is slanted in the wrapping material 50. In addition, the pressure of the deploying and expanding airbag 31 can act uniformly on the entire combining part 53 which extends over a predetermined length. For this reason, the deployment and expansion of the airbag 31 can be controlled easily and properly.

(3) The combining part 53 is formed by sewing both of the edges 51 and 52, and thus the combining part 53 can be formed easily.

(4) Both of the ends of the wrapping material 50 in the width direction W of the sheet material 50a are open. For this reason, the wrapping material 50 can be configured simply. In addition, the airbag assembly 30 can be inserted through the open upper end of the wrapping material 50 into the wrapping material 50, and the wrapping material 50 can be easily mounted in the airbag assembly 30.

<Modification>

Incidentally, for example, the above-described embodiment can be modified as follows. The first engagement part 61 may be formed also with the same notch portion 65 as that in the second engagement part 62.

The notch portion 65 of the second engagement part 62 may not be provided.

The lower end of the wrapping material 50 may be closed by sewing and the like.

In the above-described embodiment, the combining part 53 is formed by sewing both of the edges 51 and 52 of the sheet material 50a. However, the combining part may be formed by bonding or thermal welding.

The number of the mounting bolt 38 may be three of more.

The shape of the notch portion 70 may be changed properly to a trapezoidal shape.

The position of the deepest part of the notch portion 70 in the length direction L of the sheet material 50a may be set similarly to that of the combining part 53.

What is claimed is:

1. A vehicle airbag device comprising:
   a folded airbag;
   a long gas generator which is mounted in a vehicle and supplies an inflation gas to the airbag, the gas generator includes a mounting bolt, protruding from the gas generator, the mounting bolt mounts the gas generator in the vehicle; and
   a wrapping material which covers a periphery of an airbag assembly including the airbag and the gas generator and is rupturable at a time of deployment and expansion of the airbag, the wrapping material including:
      a combining part which is formed of a sheet material, the sheet material has a first edge and a second edge opposite thereto in a length direction of the sheet material, the combining part combines the first edge and the second edge, which are overlapped with each other;
      a pair of engagement parts, wherein each of the engagement parts is formed in parallel with the combining part in a width direction of the sheet material and is engaged in the gas generator, the engagement parts are formed in the first edge and the second edge of the sheet material in the length direction, respectively; an insertion hole through which the mounting bolt is inserted is formed in each of the engagement parts; and
      a notch portion formed between the combining part and the engagement parts, wherein
         a depth of the notch portion in the length direction of the sheet material is less than or equal to a depth in the length direction of where the first edge and the second edge are combined in the combining part.

2. The vehicle airbag device according to claim 1, wherein:
   the gas generator further includes an inflator which is capable of supplying the inflation gas, and a retainer which holds the inflator, wherein
   the mounting bolt is provided on a side surface of the retainer.

3. The vehicle airbag device according to claim 1, wherein:
   a plurality of the mounting bolts are provided at an interval in a longitudinal direction of the gas generator to be directed to a same direction;
   a plurality of the insertion holes through which the plurality of the mounting bolts are inserted respectively are formed in each of the engagement parts; and
   the combining part extends along a virtual linear line connecting centers of the plurality of the insertion holes.

4. The vehicle airbag device according to claim 1, wherein the combining part is formed by sewing together the first edge and the second edge.

5. The vehicle airbag device according to claim 1, wherein the wrapping material has a first end and a second end opposite thereto in the width direction of the sheet material, and the first end and the second end of the wrapping material are open.

6. A wrapping material for covering a periphery of an airbag assembly including an airbag and a gas generator which includes a mounting bolt protruding therefrom, the wrapping material being rupturable at a time of deployment and expansion of the airbag, the wrapping material comprising:
   a combining part which is formed of a sheet material, the sheet material has a first edge and a second edge opposite thereto in a length direction of the sheet material, the combining part combines the first edge and the second edge, which are overlapped with each other;
   a pair of engagement parts, wherein each of the engagement parts is formed in parallel with the combining part in a width direction of the sheet material and is engaged in the gas generator, the engagement parts are formed in the first edge and the second edge of the sheet material in the length direction, respectively; an insertion hole adapted for insertion of the mounting bolt therethrough is formed in each of the engagement parts; and
   a notch portion formed between the combining part and the engagement parts, wherein
      a depth of the notch portion in the length direction of the sheet material is less than or equal to a depth in the length direction of where the first edge and the second edge are combined in the combining part.

7. The vehicle airbag device according to claim 1, wherein:
   the gas generator further includes an inflator which is capable of supplying the inflation gas, wherein
   the mounting bolt is provided on a side surface of the inflator.

* * * * *